Figure 1:
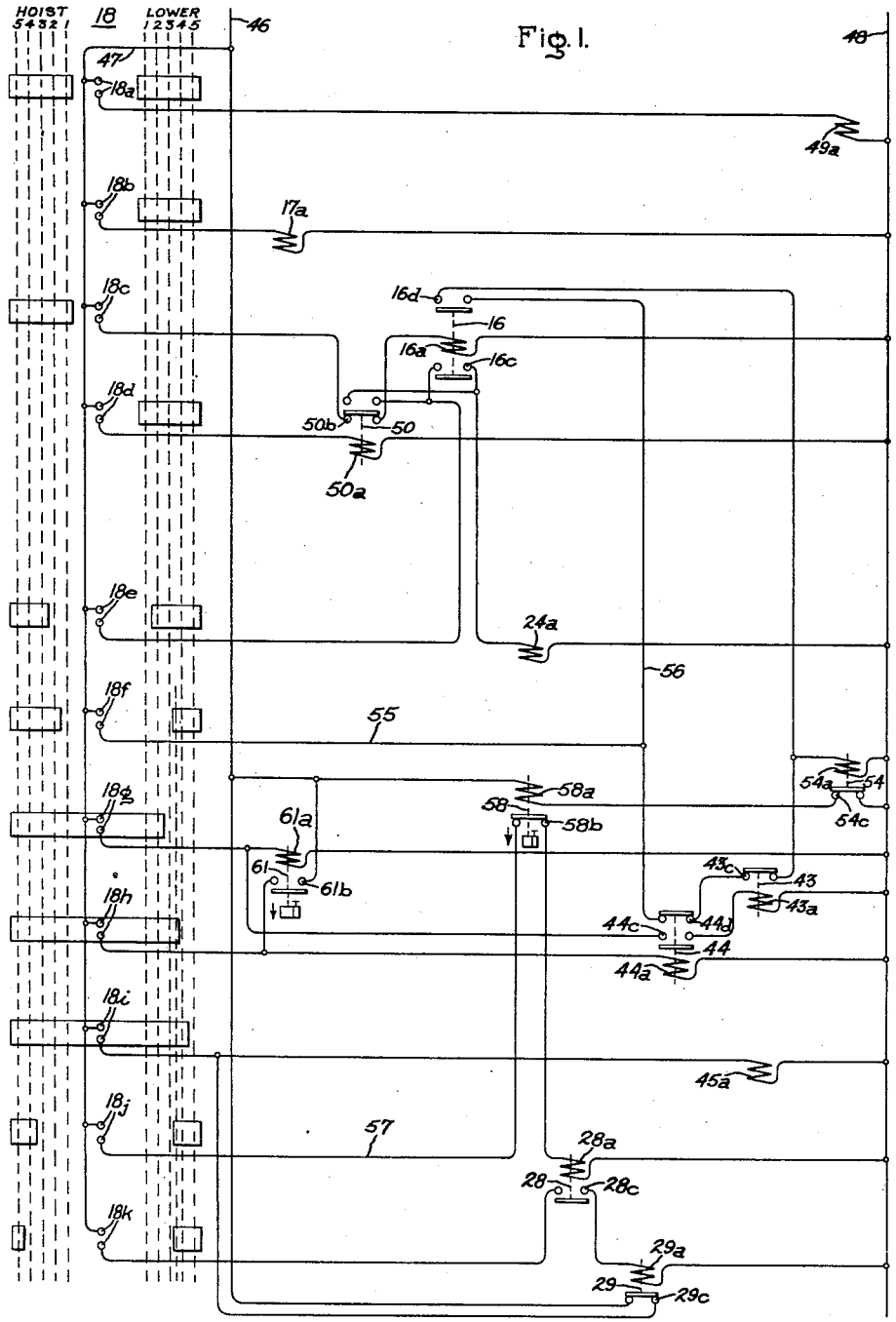

May 30, 1944.  J. W. COOKE  2,350,150
CONTROL SYSTEM
Filed Nov. 6, 1942   2 Sheets-Sheet 1

Inventor:
James W. Cooke,
by Harry E. Dunham
His Attorney.

Inventor:
James W. Cooke,
by Harry E. Dunham
His Attorney.

Patented May 30, 1944

2,350,150

UNITED STATES PATENT OFFICE 2,350,150

CONTROL SYSTEM

James W. Cooke, Schenectady, N. Y., assignor to General Electric Company, a corporation of New York Application November 6, 1942, Serial No. 464,737

4 Claims. (Cl. 172—179)

This invention relates to control systems, more particularly to systems for controlling the operation of electric motors, and it has for an object the provision of a simple, reliable, and improved control system of this character.

More specifically, the invention relates to motor control systems for crane hoists and the like in which the motor is frequently subjected to overhauling loads, and in which a power type limit switch is employed to interrupt the power circuit for the motor and to establish a loop dynamic braking circuit in which the armature, field winding, and a dynamic braking resistor are included. Owing to certain useful operating characteristics, series motors are extensively used for driving hoists. In operation of the crane outside the limit switch zone, crane hoist master switches provide for the connection of the motor as a series machine when operating in the hoisting direction, and as the equivalent of a shunt machine when operating in the lowering direction.

However, within the limit switch zone, the contacts of the limit switch so change the connections between the armature and the series field winding that when the master switch is moved to a lowering position, the armature and field winding are connected in a straight series circuit to the source and are shunted by the dynamic braking resistor of the loop circuit. This circuit remains established as long as the limit switch remains tripped, i. e., as long as the hook block remains in the limit switch zone.

Such a circuit produces no dynamic braking torque when the load becomes overhauling because, with the field winding and armature connected in series to the source, the current in the armature cannot reverse without the field current decreasing to zero. Since the pull of the load and the torque of the motor are in the same direction, a dangerously high speed can be attained in coming out of the limit switch zone in the interval between the connection of the motor to the power supply and the resetting of the limit switch. Furthermore, owing to improvements in crane construction and increased operating speeds, it has become necessary to increase the amount of dynamic braking resistance which is inserted in the loop circuit by the limit switch when the block reaches the overhoist limit. Since this resistance is shunted around the armature and series field winding when the lowering connections are established by the master switch, a correspondingly increased current is diverted through the motor, a correspondingly increased torque is developed, and the speed of the motor in the lowering direction is likewise correspondingly increased. When the limit switch is reset, the equivalent of the shunt motor circuit is established. If at this time the motor has attained a relatively high speed, e. g., 250 per cent of the rated full load speed, or higher, its speed will be reduced abruptly by the resetting of the limit switch. This sudden change in speed subjects all the mechanical parts of the crane to a severe shock which is highly objectionable.

Accordingly, one object of this invention is the provision of means for limiting the speed of the motor to a safe value while lowering out of the limit switch zone. The hoist motor, solenoid operated brake, contacts of the power type limit switch, and the loop dynamic braking resistor controlled by the limit switch are located on the trolley motion of the crane. The balance of the equipment, such as contactors, relays, switches, and speed controlling resistors are mounted on a panel which is located on the bridge structure of the crane. Consequently, trolley wires and cooperating collector shoes are required to transfer power between the control apparatus panel on the bridge, and the motor, brake solenoids, and limit switch on the trolley motion structure. For reasons of economy, maintenance, and limitations of space, it is desirable that the number of trolley wires on a crane be kept at a minimum.

Another object of the invention, therefore, is the provision of means for limiting the speed of the hoist motor while lowering out of the limit zone without increasing the number of trolley wires and without adding any additional control apparatus on the control panel.

In carrying the invention into effect, in one form thereof, the overhoist limit switch is arranged to disconnect the motor from its source and to complete a loop circuit including a resistor and the armature and series field winding of the motor, which effectively assists in braking the motor to rest. The limit switch is also provided with normally open contacts which close when the limit switch is tripped to complete an armature shunting dynamic braking circuit which has no material effect on the dynamic braking torque of the motor while the master switch is in a hoisting position or in the off position, but which becomes fully effective when the power lowering connections are completed by the master switch.

Another aspect of this invention is the provision of means for preventing oscillation of the hook in the over-hoist limit zone. Heretofore, crane hoist controls have been provided with a spring-closed contactor for establishing an emergency dynamic braking circuit in shunt with the motor armature and field winding to provide slow speed lowering in the event of power failure or failure of the solenoid brake to set. In order to obtain improved speed regulation when hoisting, it has been customary to maintain this emergency dynamic braking contactor closed on one or more low speed points of the master switch. This shunted motor connection introduces an undesirable operating condition in that it establishes a by-pass or sneak circuit around the motor armature and series field winding which keeps the series brake released even though the limit switch has operated to disconnect the hoist motor from its source. Consequently, if the load is overhauling, it will descend beyond the point at which the limit switch resets itself and will then start up again. Thus an oscillating condition of the crane hook is set up which will continue until the operator returns the master switch to the off position, in which the brake can set and stop the hoist.

Heretofore, in order to eliminate this undesirable operating characteristic, it has been necessary to provide additional control apparatus on the control panel or alternatively, to provide an extra trolley wire and collector shoe between the control panel and the trolley structure.

The present invention safely limits the speed of the motor while lowering out of the limit zone and also provides means for eliminating oscillating of the hook in the hoisting direction with the emergency dynamic braking contactor deenergized and closed on one or more of the slow speed positions hoist of the master switch and with the hook in the tripped limit switch zone. This is accomplished by providing the limit switch with a normally closed contact which is in the emergency dynamic braking circuit, and which opens when the limit switch is tripped to interrupt the sneak circuit through the operating coil of the series brake thereby to effect the setting of the brake. Thus the invention permits the desired improved regulation of the slow hoisting speeds and at the same time eliminates the extra control apparatus or the alternative additional trolley wire that was formerly required to prevent oscillation of the hook.

Figure 2:
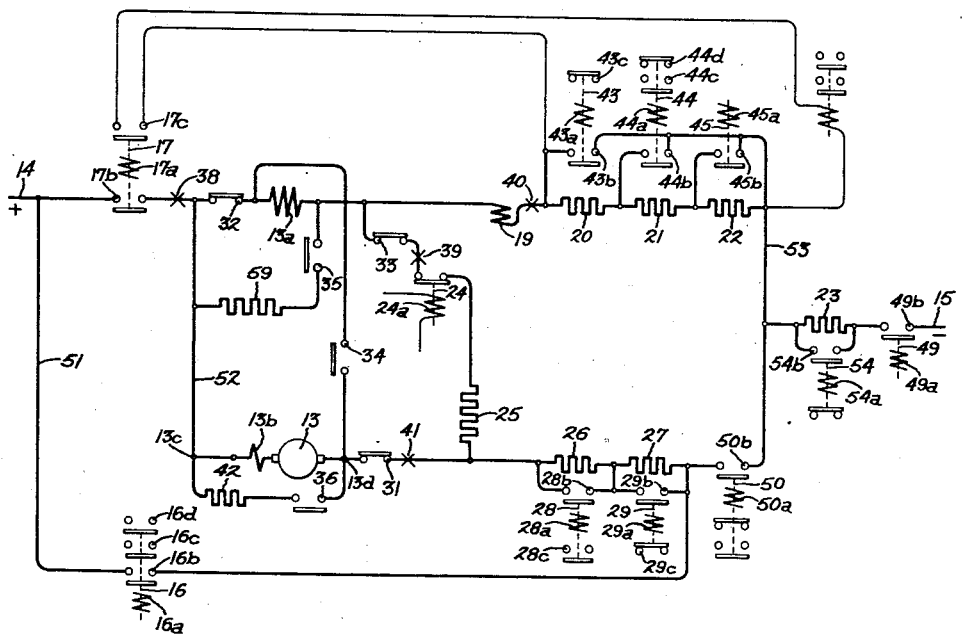
Figure 3:
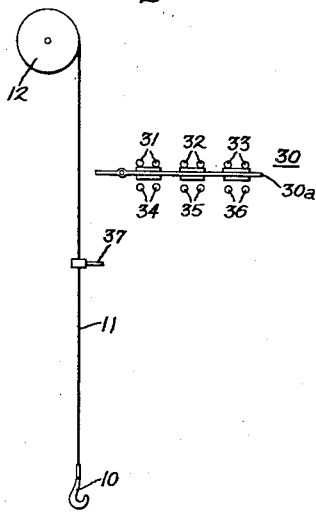

For a better and more complete understanding of the invention, reference should now be had to the following specification and to the accompanying drawings in which Fig. 1 is a simple, diagrammatical illustration of the master switch and control circuits which are controlled thereby; Fig. 2 is a simple diagrammatical sketch of the power circuits and of the contacts therein which are controlled by the master switch and control circuits of Fig. 1; and Fig. 3 is a simple, diagrammatical sketch of a crane hoist cable and power type limit switch operated thereby.

Referring now to the drawings, the hook 10 of a crane hoist is connected to a cable 11 which is wound upon a drum 12. The hoist cable drum is driven by suitable driving means such as the electric motor 13. This hoist motor is illustrated as a series type direct current motor having a series field winding 13a and a commutating field winding 13b. The motor may be supplied from any suitable source such as represented by the two supply lines 14 and 15. A pair of reversing contactors 16 and 17 is provided for connecting the hoist motor to the power supply for rotation in either the hoisting or lowering direction. These contactors have operating coils 16a and 17a, respectively, as indicated in Fig. 2. In Fig. 1, the operating coils 16a and 17a are shown included in the circuits by means of which they are controlled. When contactor 16 is closed, the motor 13 is connected to the source for rotation in the hoisting direction and when the contactor 17 is closed, the motor is connected to the source for rotation in the lowering direction.

Referring to Fig. 1, the operating coils 16a and 17a of the directional contactors are under the control of a multiposition, reversing type master switch 18. The master switch is illustrated as having five "hoist" positions and five "lower" positions. If desired, either a larger or smaller number of operating positions for each direction of rotation may be provided.

The hoist motor 13 is provided with a solenoid brake (not shown) having its operating solenoid 19 connected in series with the motor series field winding 13a through resistors 20, 21, 22, and 23 to the source. The brake is normally set by a spring and is released by the solenoid 19 when the solenoid is energized. Resistors 20, 21, and 22 are active during the lowering operation, but are short-circuited in all positions of the master switch during the hoisting operation.

A normally spring-closed contactor 24 serves to establish a dynamic braking, loop circuit connection for the armature and field winding of motor 13 through a resistor 25 at the "off" position of the master switch. This contactor remains closed on the first or lowest speed position of the master switch in the lowering direction and on the first and second master switch positions in the hoisting direction for the purpose of providing good regulation for slow speed operation. As shown, the contactor 24 is provided with an operating coil 24a which, when energized, serves to open the contactor against the tension of its closing spring (not shown). The control circuit for the operating coil 24a is illustrated in Fig. 1.

A plurality of accelerating resistors 26 and 27 are connected in series with the armature of motor 13. These resistors are controlled by means of accelerating contactors 28 and 29 having operating coils 28a and 29a, respectively the control circuits for which are illustrated in Fig. 1.

A power type overhoist limit switch 30 is provided for disconnecting the motor 13 from the source at a predetermined limit of operation of the hook block in order to prevent overtravel in the hoisting direction. This limit switch is illustrated in Fig. 3 as comprising a plurality of pairs of stationary contacts 31, 32, 33, 34, 35, and 36 and a movable member 30a carrying a plurality of pairs of contacts which cooperate with the stationary contacts. A projecting member 37 secured to the cable 11 serves to actuate the movable contact carrying member 30a. The contacts 31, 32, and 33 are normally closed, and the contacts 34, 35, and 36 are normally open, except when the hook block reaches its overhoist limit and the member 37 actuates the movable member 30a to open contacts 31, 32, and 33 and to close contacts 34, 35 and 36.

The hoist motor 13, solenoid brake 19, and limit switch 30 are mounted on the trolley motion structure, and the various resistors and contactors described in the foregoing are mounted on the main magnetic control panel which is usually located on the bridge structure. The master switch 18 is also usually mounted on the bridge structure. Thus it becomes necessary to make the power connections between the motor and brake and the panel by means of trolley wires and collector shoes. These trolley wires and collector shoes are indicated by reference characters 38, 39, 40, and 41 in Fig. 2.

For the purpose of limiting the speed of the motor when lowering out of the limit switch zone after the limit switch has been tripped, a dynamic braking circuit which includes a resistor 42 in shunt with the armature of motor 13 is provided. It will be noted that the series field winding 13a is not shunted by the dynamic braking circuit which is therefore an armature shunting circuit in contrast to a motor shunting circuit which would shunt both the armature and the series field winding. The normally open stationary contacts 36 and cooperating movable contacts of the limit switch are included in this armature shunting dynamic braking circuit. When the normally open contacts 36 are bridged by their cooperating movable contacts, the dynamic braking resistor 42 is connected in a shunt circuit to the armature terminals 13c and 13d of the hoist motor 13. The dynamic braking resistor 42 is mounted on the trolley structure with the motor.

For the purpose of interrupting the sneak circuit through the contacts 16b of the hoist contactor, contactors 29 and 28, resistor 25, normally closed contacts 24 and the brake operating solenoid 19 when the limit switch is tripped with the master switch in the first or second position hoist, the normally closed contacts 33 of the limit switch are included in this circuit between the trolley wire 39 and the solenoid 19.

With the foregoing understanding of the elements and their organization in the control system, the operation of the system will readily be understood from the following detailed description.

The hoist motor 13 is at standstill and the solenoid brake 19 is set by its operating spring. The remainder of the apparatus is in the normal or deenergized condition. In the off position of the master switch, an emergency dynamic braking circuit is established which is traced from the armature terminal 13d through limit switch contacts 31, dynamic braking resistor 25, normally closed contacts of emergency dynamic braking contactor 24, limit switch contacts 33, series field winding 13a, limit switch contacts 32 to the terminal 13c of the motor. Also, in the off position of the master switch, the operating coils 43a, 44a, and 45a of contactors 43, 44, and 45, respectively, are energized. The energizing circuits for operating coils 43a, 44a, and 45a are illustrated in Fig. 1 and are traced from the side 46 of a suitable source of control voltage through conductor 47, fingers 18g, 18h, and 18i of master switch 18, bridged by cooperating segments and through operating coils 43a, 44a, and 45a in parallel to the opposite side 48 of the source of control voltage. In this connection, it will be noted that the operating coils 44a and 45a of contactors 44 and 45, respectively, are energized and that the coil 43a of contactor 43 is energized when the contacts 44c of contactor 44 are closed. As a result, contactors 43, 44, and 45 are closed and resistors 20, 21, and 22 are short-circuited.

To initiate the hoisting operation, the master switch is operated to its first position "hoist." In this position, the coil 49a of line contactor 49 is energized, and the contactor closes its main contacts 49b to connect one terminal of the hoist motor to the side 15 of the power supply.

Simultaneously, the operating coil 16a of the hoist contactor 16 is energized. The circuit for this coil is traced from conductor 47 through fingers 18c of the master switch bridged by the cooperating segment, normally closed contacts 50b of contactor 50, operating coil 16a of the hoist contactor to the side 48 of the source. In response to energization, the hoist contactor closes its normally open contacts 16b, 16c, and 16d. Contacts 16b in closing complete the power circuit for the motor which is traced from the side 14 of the supply source through conductor 51, contacts 16b of the hoist contactor, accelerating resistors 27 and 26, limit switch contacts 31, armature of motor 13, conductor 52, limit switch contacts 32, series field winding 13a, series brake operating solenoid 19, contacts 43b of contactor 43, conductor 53, resistor 23 and contacts 49b to the side 15 of the source. Contacts 16c of the hoist contactor in closing prepare an energizing circuit for the operating coil 24a of the emergency dynamic braking contactor. However, this circuit remains open at the fingers 18e on the first and second positions hoist of the master switch, and consequently, the closing spring of emergency dynamic braking contactor 24 maintains the contacts 24b closed at this time. The normally closed contacts of emergency dynamic braking contactor 24 complete a shunting circuit for the motor 13 through resistor 25. This shunting circuit causes the motor 13 to rotate at a stable slow speed to hoist the load. It is to be observed that the operating coil 24a of contactor 24 remains unenergized on the second point hoist of the master switch, and consequently the motor shunting circuit through resistor 24 remains intact on the second position hoist.

To increase the speed of the motor, the master switch 18 is moved to its second position hoist. In this position, a circuit is completed for the operating coil 54a of accelerating contactor 54. This circuit is traced from the power conductor 47, through fingers 18f bridged by the cooperating segment on the hoist side of the master switch, conductors 55 and 56, contacts 16d of the hoist contactor, and through operating coil 54a to the side 48 of the source. In response to energization, contactor 54 closes its contacts 54b to short-circuit accelerating resistor 23. This results in increasing the speed of the motor 13.

In the third position hoist of the master switch, the energizing circuit for the operating coil 24a of the emergency dynamic braking contactor 24 is completed at the fingers 18e. As a result of its energization, contactor 24 opens its contacts to interrupt the motor shunting circuit through the resistor 25. This results in further increasing the speed of the motor 13.

Movement of the master switch to the fourth position hoist, completes an energizing circuit for the operating coil 28a of contactor 28. This circuit is traced from the power conductor 47 through fingers 18j of the master switch bridged by the cooperating segment on the hoist side, conductor 57, normally closed contacts 58b of relay 58, operating coil 28a of contactor 28 to the side 48 of the source. Relay 58 is preferably a time delay relay which closes its contacts a predetermined interval of time after the deenergization of its operating coil 58a by the opening of contacts 54c of contactor 54. Therefore the energizing circuit for the operating coil 28a is completed at the expiration of this predetermined interval of time, and the contactor 28 closes its contacts 28b to short-circuit resistor section 26, thereby further to increase the speed of the motor. Contactor 28 also closes its contacts 28c to prepare the energizing circuit for the operating coil 29a of accelerating contactor 29.

Movement of the master switch 18 to the fifth position hoist completes an energizing circuit for the operating coil 29a and in response to energization, contactor 29 closes its contacts 29b through short-circuit resistance switch 27 and thereby accelerates the motor 13 to its full hoisting speed.

If for some reason the hoist motor should be maintained energized until the hook block reaches the overhoist limit, the projection 37 strikes the movable contact carrying arm 30a and moves it from the position in which it is illustrated to a position in which the contacts 31, 32, and 33 are open and the contacts 34, 35, and 36 are closed. Contacts 31 and 32 in opening disconnect the motor 13 from the source, and contacts 33 in opening interrupt the sneak circuit through the resistor 25 and the contacts of emergency braking dynamic contactor 24 to the solenoid 19 of the series brake which circuit would be intact if the master switch 18 were on either the first or second position hoist. Contacts 34 and 35 in closing complete a dynamic braking circuit for the motor 13 which is traced from the armature terminal 13d through contacts 34, series field winding 13a, contacts 35, dynamic braking resistor 59, mounted on the crane trolley, and conductor 52 to the left-hand terminal 13c of the motor. In this connection, it will be noted that the contacts 34 and 35 of the limit switch reconnect the series field winding 13a to the motor armature in such a manner that the current flows through the series field winding in the same direction as it did during the previous power operation. As a result, the current in the series field winding does not decrease to zero, and dynamic braking torque is therefore available for retardation of the motor, drum, hook, and lead. Limit switch contacts 36, in closing, connect an additional dynamic braking resistor 42 in shunt to the armature terminals of the motor. The connections of the additional dynamic braking circuit in parallel with the armature of the motor will increase the current flowing through the armature. However, a portion of the current flowing through the armature will be by-passed around field 13a through the contacts 36 and the resistor 42. The division of current through the resistors 42 and 59 will depend upon the ratio of the resistances of resistors 42 and 59. The armature shunting circuit established by the contacts 36 through resistor 42 will not have any material effect upon the dynamic braking torque produced while the armature of the motor 13 is still rotating in the hoisting direction because this torque is a function of armature amperes and field flux. Although the dynamic braking circuit through the resistor 42 will produce an increase in the armature current, this circuit will also divert current from the field winding 13a and thus the product of armature and field ampere turns will remain approximately the same as before the closing of contacts 36.

Since the sneak circuit through the resistor 25 to the solenoid 19 of the series brake is interrupted at the contacts 33, the spring of the brake sets the shoes against the drum and assists the dynamic braking torque of the motor in bringing the motor and its load to rest. The mechanical brake being set, the load will not descend, and consequently the undesirable oscillating condition described in the foregoing is completely corrected. As a result, the special apparatus which was heretofore required to correct this condition in crane hoists is unnecessary, and this results in a saving in cost and simplification of the control circuits. The return of the master switch restores the apparatus to the off position to the normal position in which it is illustrated in the drawings with the exception that the limit switch remains in the tripped position. With the limit switch in the tripped position, the contacts 34, 35, and 36 remain closed and the armature shunting and motor shunting circuits through resistors 42 and 59, respectively, remain intact. To lower the hoist out of the limit switch zone, the master switch is moved to one of its lowering positions.

Movement of the master switch to the first position lowering completes an energizing circuit for the operating coil 49a of contactor 49 which closes its contacts 49b to connect the junction point of the field winding 13a and the dynamic braking resistor 59 to the side 15 of the source. Contactors 43, 44, and 45 remain picked up in the first position lowering. The energizing circuits for the operating coils 43a, 44a, and 45a of these contactors are the same as traced in the foregoing description of the hoisting operation. Consequently, resistors 20, 21, and 22 are short-circuited on the first position lowering. Also, in the first position lowering of the master switch, the operating coil 17a of the lowering contactor is energized, and the lowering contactor closes its normally open contacts 17b and 17c. Contacts 17b in closing complete connections from the motor armature to the side 14 of the power supply. The motor circuit extends from the side 14 of the source through the contacts 17b of the lowering contactor, conductor 52, through commutating field winding 13b and the armature of motor 13, the limit switch contacts 34, series field winding 13a, brake solenoid 19, contacts 43b, conductor 53, and resistor 23 to the side 15 of the source. The operating coil 50a of the contactor 50 is also energized on the first position lowering of the master switch, and the contactor closes its contacts 50b. However, this has very little effect on the operation of the motor at this point, since the limit switch contacts 31 are still open.

On the second position lowering of the master switch, an energizing circuit is established for the operating coil 24a of the emergency dynamic braking contactor, and in response to its energization the contactor opens its contacts. This, however, has substantially no effect on the speed of the motor when operating in the limit zone. As the master switch leaves its second position lowering, the energizing circuits for the relay 61 and contactor 43 are interrupted. In response to deenergization, relay 61 opens its normally open contacts 61b, and contactor 43 opens its normally open contacts 43b to insert resistance section 20 in the motor circuit. Contactor 43, in dropping out, also closes its normally closed contacts 43c to prepare an energizing circuit for the operating coil 54a of contactor 54. The relay 61 is preferably a time delay relay having a time delay in its dropout so that its contacts remain closed for a predetermined interval of time after the energizing circuit is interrupted at the fingers 18g of the master switch.

Between the third and fourth positions lowering of the master switch, the fingers 18f are bridged by the cooperating segment on the lowering side further to prepare the energizing circuit for the operating coil of contactor 54. However, this energizing circuit remains open at interlock contacts 44d of contactor 44.

Movement of the master switch to the fourth position lowering interrupts the connections of the operating coil 44a through the fingers 18h of the master switch. However, the operating coil 44a remains energized through the contacts 61b of time delay relay 61 for the interval of time for which the relay 61 is adjusted. At the expiration of this time interval, relay 61 drops out and opens its contacts 61b to interrupt the energizing circuit of contactor 44 which opens its main contacts 44b to insert resistor section 21 in the motor circuit. Contactor 44 in dropping out also closes its normally closed contacts 44d to complete the previously prepared energizing circuit for the operating coil 54a of contactor 54. In response to energization, contactor 54 closes its main contacts 54b to short-circuit the resistor 23. Contactor 54, in picking up, also opens its normally closed contacts 54c to interrupt the energizing circuit for the operating coil of time delay relay 58 which after a predetermined interval of time drops out and closes its normally closed contacts 58b to complete an energizing circuit for the operating coil 28a of contactor 28. This energizing circuit is traced through the fingers 18j bridged by the cooperating segment on the lowering side of the master switch through the contacts 58b and the operating coil 28a to the side 40 of the source.

Responsively to energization, contactor 28 closes its main contacts 28b to short-circuit the resistor 26 in the motor circuit and simultaneously it closes its interlock contacts 28c to complete an energizing circuit for the operating coil of contactor 29. Contactor 29 in responding to energization closes its main contacts 29b to short-circuit the resistor section 27 in the motor circuit and simultaneously opens its interlock contacts 29c to interrupt the energizing circuit for the operating coil 45a of contactor 45 if by this time the master switch has been moved to its fifth position. Assuming that the master switch has been moved to its fifth position, contactor 45 is deenergized and opens its main contacts 45b to insert resistor 22 in the motor circuit.

When the master switch was moved to the first position lowering, the motor 13 was connected to the source with the armature in series with the field winding 13a. Although the loop circuit through the armature, field winding 13a, resistor 59, and limit switch contacts 34 and 35 provided a dynamic braking circuit when the motor was disconnected from the power source by the tripping of the limit switch, dynamic braking of the motor is no longer available when the motor is reconnected to the power source by the lowering contactor 17 because the motor armature and series field windings are connected in series to the source with the resistor 59 shunting the armature and field winding. Consequently, the only effect of the resistor 59 is to divert a portion of the current from the armature and field winding. As a result of this loss of dynamic braking torque, the motoring torque and overhauling torque produced by the load on the hook are in the same direction. In the absence of any corrective means, it is possible for the motor 13 to attain an excessively high speed in the lowering direction before the hook block reaches the limit and resets the limit switch 30. This is prevented, however, by the action of the armature shunting dynamic braking circuit established through the resistor 42 by the limit switch contacts 36. The shunting of the armature of motor 13 by the resistor 42 causes the motor to have shunt motor characteristics so that either motor torque or dynamic braking torque, within limits, is obtained depending upon the load conditions. If the load is overhauling, dynamic braking torque will be obtained and the descending speed of the motor in the limit zone will be limited to a safe value.

Since the speed of the motor 13 is maintained at a reasonable value during the descent of the hook block through the limit switch zone, no severe shocks or strains are imposed upon the apparatus as a result of a sudden substantial decrease in speed when the limit switch resets.

When the hook block reaches the reset point of the limit in the lowering direction, the member 37 engages the contact carrying arm 30a of the limit switch, thereby resetting the limit switch to open the contacts 34, 35, and 36 and to close the contacts 31, 32, and 33. Contacts 34 and 35 in opening, interrupt the loop circuit through the armature of motor 13, the series field winding, and resistor 59. Contact 36 in opening, interrupts the armature shunting circuit through the resistor 42. Contact 32 in closing, connects the field winding 13a across the source 14, 15 through resistors 20, 21, and 22, and contact 31 in closing, connects the armature of the motor to the source. The motor is now connected as a shunt motor with the current through the field winding 13a weakened by the resistors 20, 21, and 22. Contacts 33 in closing, have no effect upon the operation of the motor at this point, since the emergency dynamic braking circuit through the resistor 25 is open at the contacts of the emergency dynamic braking contactor 24. Since all the armature resistance is short-circuited and since the maximum amount of resistance is inserted in the field circuit, the motor will now operate at maximum speed in the lowering direction.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. In a control system for hoists and the like having a driving motor provided with a series field winding, a brake for said motor having an operating coil in series with said motor, a multiposition reversing type master switch for selectively completing connections from said motor to a source for rotation in either direction, a circuit including a resistor for shunting the armature and field winding of said motor to provide stable slow speed operation of said motor on a selected position of said master switch, a dynamic braking circuit including a resistor in shunt with the armature of said motor, and a limit switch device having normally closed contacts in said shunting circuit, normally closed contacts in the connections from said motor to said source and normally open contacts in said dynamic braking circuit, said limit switch responding at a predetermined limit of operation to open said normally closed contacts thereby to disconnect said motor from said source and to interrupt said shunting circuit and to close said normally open contact to complete said dynamic braking circuit.

2. In a control system for hoists and the like having a series wound driving motor, a reversing type master switch, and reversing switching means controlled thereby for selectively connecting said motor to a source for rotation in either direction, a dynamic braking circuit including a resistor having connections to the armature terminals of said motor, and limit switch mechanism having normally closed contacts in the connections from said motor to the source and normally open contacts in said dynamic braking circuit, said limit switch being responsive at a predetermined limit of operation of said motor in one direction for opening said normally closed contacts to interrupt the connections of said motor to said source and for closing said normally open contacts to complete said dynamic braking circuit and operable at said limit in the reverse direction of rotation of said motor for opening said normally closed contacts to interrupt said dynamic braking circuit and for closing said normally closed contacts to connect the series field winding of said motor to said source in a circuit in shunt with said armature.

3. In a control system for hoists and the like having a series wound driving motor, a reversing type master switch for selectively controlling the connection of said motor to a source for rotation in either direction of rotation, a first dynamic braking circuit having connections across the armature and series field winding of said motor, a second dynamic braking circuit including a resistor having connections to the armature terminals of said motor, limit switch mechanism having normally closed contacts in the connections from said motor to said source and normally open contacts in each of said dynamic braking circuits, said limit switch mechanism responding at a predetermined limit of operation in one direction to open said normally closed contacts to interrupt the connections from said motor to the source and close said normally open contacts to complete said dynamic braking circuits, reversing switching means responsive to operation of said master switch for connecting said motor to said source for rotation in the reverse direction, and said limit switch responding at said limit in the reverse direction of rotation of said motor to open said normally open contacts to interrupt said dynamic braking circuits and to close said normally closed contacts to connect said series field winding to the source in a circuit in parallel with the armature of said motor.

4. In a control system for hoists and the like having a series wound driving motor, a master switch for selectively controlling the connection of the motor to a source for rotation in either direction, a brake for said motor having an operating coil connected in series with said motor, a circuit including a resistor for shunting the armature and field winding of said motor to provide a stable slow operating speed of said motor, a first dynamic braking circuit having connections across the armature and series field winding of said motor, a second dynamic braking circuit including a resistor having connections to the armature terminals of said motor, limit switch mechanism having normally closed contacts in said shunting circuit and in the connections from said motor to said source and normally open contacts in each of said dynamic braking circuits, said limit switch mechanism being operable at a predetermined limit of operation in one direction of rotation of said motor to open said normally closed contacts to interrupt the connections from said motor to the source and to interrupt the circuit of said brake operating coil and to close said normally open contacts to complete said dynamic braking circuits, reversing switching means responsive to operation of said master switch for connecting said motor to said source for rotation in the reverse direction, and said limit switch responding at said limit in the reverse direction of rotation of said motor to open said normally open contacts to interrupt said dynamic braking circuits and to close said normally closed contacts to complete said shunting circuit and to connect said series field winding to the source in parallel with the armature of said motor.

JAMES W. COOKE.